April 18, 1961 C. S. HICKLE ET AL 2,980,779
MOTOR PROTECTOR
Filed Oct. 22, 1958 2 Sheets-Sheet 1

INVENTORS.
CLYDE S. HICKLE
BY PAUL B. HOVER
ATTORNEY.

April 18, 1961

C. S. HICKLE ET AL 2,980,779

MOTOR PROTECTOR

Filed Oct. 22, 1958

INVENTORS.
CLYDE S. HICKLE
BY PAUL B. HOVER

Roy E Raney
ATTORNEY.

United States Patent Office 2,980,779
Patented Apr. 18, 1961

2,980,779
MOTOR PROTECTOR

Clyde Stephan Hickle and Paul B. Hover, Columbus, Ohio, assignors to Ranco Incorporated, Columbus, Ohio, a corporation of Ohio Filed Oct. 22, 1958, Ser. No. 768,797

1 Claim. (Cl. 200—113)

The present invention relates to an improved thermally responsive electric motor protector operative to open the circuit of an electric motor in the event of a stalled rotor condition or the occurrence of a more or less gradual overload which if continued would damage the motor.

It is well known in the electric motor protector art to provide a normally closed switch in the motor circuit and a bimetal for opening and closing the switch when the bimetal is heated and cooled so that the temperature of the motor windings will not become overheated. The bimetal may be heated either by a resistor in the circuit or by its internal resistance to the flow of the motor current therethrough.

One difficulty with the type of protector mentioned is that if a resistance is provided which will cause the bimetal to open the switch quickly in the event of a heavy current overload, such as occurs with a stalled rotor condition, the bimetal will reclose the switch within a relatively short period and not permit the motor windings to cool sufficiently before the reclosing of the circuit. Also, such a resistance causes premature opening of the switch in response to running overloads which overloads are not detrimental to the motor in many instances. This situation is particularly troublesome in providing motor protectors for refrigerator compressor motors of the sealed unit type wherein the motor windings are cooled by the refrigerant circulating in the system so that running overloads may safely occur, but quick circuit opening is required in the event of a stalled rotor condition.

The principal object of the present invention is to provide an improved bimetal member for actuating a motor protector switch, which member has heat dissipating characteristics permitting heat resistance of relatively high value to be employed to heat the bimetal whereby the bimetal has a relatively quick switch opening response to locked rotor currents and yet the cooling rate of the bimetal is relatively prolonged so that during cycling of the motor protector switch under locked rotor conditions, the ratio of the "off" or open periods of the protector switch relative to the "on" or closed periods of the switch is greater than would be the case of thermal type overload protectors employing conventional bimetal members and designed to provide substantially the same protection against "running" or gradual overload conditions.

The invention lies in the provision of a bimetal member having fins connected with the active portion thereof by restricted heat conducting paths or sections whereby the active portion of the bimetal is rapidly heated by locked rotor current and quickly opens the motor switch, a portion of which heat, however, flows to the fins through the restricted sections, the fins, serving as heat reservoirs, feed heat back to the active portion of the bimetal to replace that lost by conduction to the supporting structure for the bimetal so that the length of time required for the bimetal to cool and reclose the switch is prolonged. On the other hand, during a gradual heating of the active portion of the bimetal, as occurs during running current overloads, a portion of the heat generated by the resistance is conducted from the active portion of the bimetal to the fins and dissipated, thereby prolonging the time required for the bimetal to attain the switch opening temperature and compensating for the relatively higher value resistance.

Other objects and advantages of the invention will be apparent from the following description of a preferred form of the invention, reference being had to the accompanying drawings, wherein—

Figure 1:
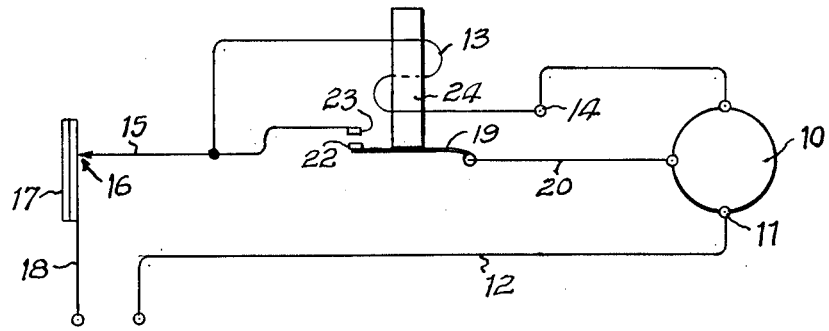
Fig. 1 is a diagram of an electric motor controlled by a combination motor starter and overload protector embodying the invention.

To better understand the invention, reference is made to Fig. 1 of the drawings, wherein a conventional split phase motor 10 is illustrated which is controlled by a conventional motor starter relay and the improved motor protector, which are preferably in a common housing, as is described hereinafter. A motor terminal 11, common to the running and starting winding leads, not shown, may be connected to one side of a suitable power supply through a terminal member 12, as described more fully hereinafter. The other lead of the running winding is connected to one lead of a solenoid 13 of a conventional magnetic starter relay by a conductor 14 and the other lead of the solenoid is connected by a conductor 15 to a normally closed overload switch 16. Switch 16 includes an improved bimetallic member 17 arranged to carry tthe motor current, one end being electrically connected by suitable contacts, described hereinafter, to conductor 15, and the other end electrically connected to a terminal member 18 for connection in the second side of the power supply circuit. The individual lead terminal of the starting winding of motor 10 is connected to a spring arm 19 through conductors 20, 21, and arm 19 carries a contact 22 which is arranged to engage a fixed contact 23 attached to an arm 15a of conductor 15. Arm 19 is spring biased in a direction to engage contacts 22, 23 but is depressed to separate the contacts by the weight of an armature 24 associated with solenoid 13 when the solenoid is de-energized or carrying normal running current. Solenoid 13 attracts armature 24 when the heavy starting current of the motor flows therethrough whereby arm 19 is released to engage contact 22 with contact 23 and close and energize the starting winding and when running speed is attained, the current through the solenoid decreases and armature 24 drops to open the contacts. The operation of the starter relay is like those well known in the art.

It is to be understood that the power supply to the motor lines may be controlled by suitable switching mechanism, such as a thermostatic switch, but since such control is immaterial to the invention, it is not shown.

Figure 2:
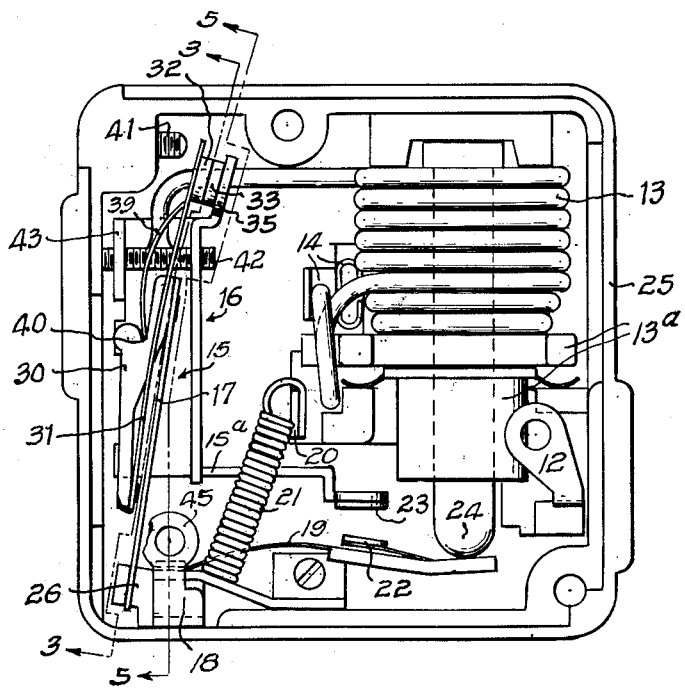
Fig. 2 is a front elevational view of the combination motor starting relay and overload protector embodying the invention, the cover of the device being removed.
Figure 3:
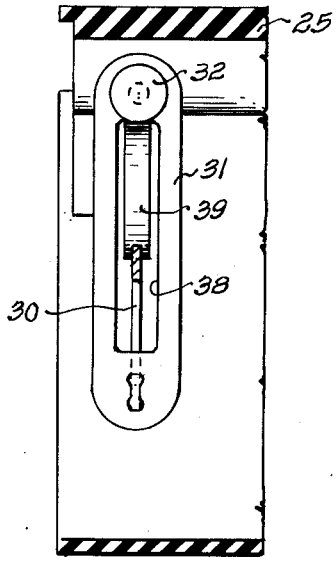
Fig. 3 is a sectional view, taken substantially along line 3—3 of Fig. 2 and showing a switch member.

Referring to Fig. 2, which shows a commercial form of the invention, the motor starting relay and overload switch mechanisms are housed in a suitable moulded casing 25 which may be electrically and mechanically attached to the motor by three prong and sheath type terminal connections which type is well known in the art and therefore not shown in detail here.

The three motor terminal prongs which are received by the sheath terminal portions are connected respectively to the common terminal 11, and to the individual leads of the running and starting windings. Terminal member 12 has binding post portion at the face of the casing for connection to one line of the power source and a sheath terminal portion thereof is embedded in the rear wall of the casing and receives the motor prong connected to terminal 11. The other two sheath terminals are formed on portions of conductors 14 and 20 and are likewise embedded in the rear wall of casing 25 and receive respectively, the motor prongs connected to the running winding and the starting winding.

Figure 4:
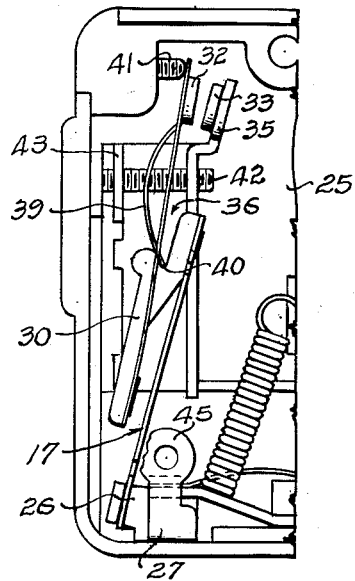
Fig. 4 is a fragmentary, side elevational view of the switch member shown in Fig. 3, showing the switch in its open position.
Figure 5:
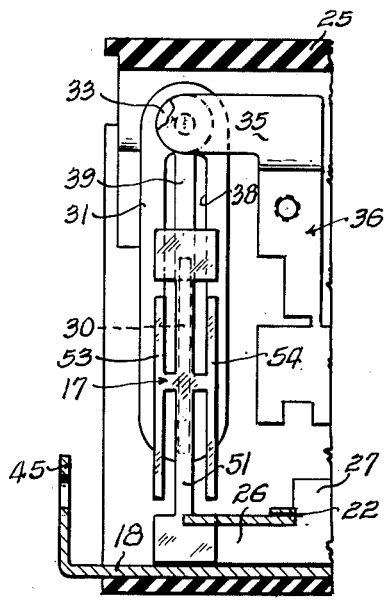
Fig. 5 is a fragmentary sectional view taken along line 5—5 of Fig. 2.

Solenoid 13 is supported on a suitable moulded insulator frame 13a in casing 25, and one lead is attached to conductor 14 and the other lead is attached to conductor 15, which is in the form of a semi-channel shape metal bracket riveted to the rear wall of the casing, and which supports one contact of switch 16, described in detail hereinafter. The overload switch is preferably a snap type actuated by the flexing of bimetal strip 17 due to heating and cooling thereof, and the lower end of the strip is spot welded to a forwardly projecting rigid arm 26 formed on the terminal member 18 which is attached to the rear wall of casing 25. The upper end of a rigid toggle link 30 is welded to the upper end of strip 17 and the lower end of the link has a spring contact strip 31 attached thereto, which strip has a contact 32 riveted to the upper end arranged to engage a contact 33 attached to a forwardly and upwardly projecting arm 35 of the conductor 15 which is in the form of a partial trough attached to the rear wall of casing 25. Contact strip 31 has a slot-like opening 38 through which toggle link 30 extends, and a spring tongue 39, formed on the strip, projects from the upper end of the slot, and the depending end edge is pivoted in a notch 40 in link 30. The length of tongue 39 causes it to bow and provide a resilient, longitudinal thrust on the upper end of strip 31 which shifts from one side to the other of the centerline of the strip as toggle link 30 is shifted by bimetal 17 and thereby snaps the upper end of the strip to either close or open contacts 32, 33 as may be seen in Figs. 2 and 4. A screw 41 threaded in an opening through the side of casing 25 limits the left hand or contact opening movement of strip 31. Normally, bimetal 17 is relatively cool and in that state is flexed to the left to close contacts 32, 33 as seen in Fig. 2. When bimetal strip 17 becomes heated to a predetermined degree, as described hereinafter, it flexes to the right, moving notch 40 of toggle link 30 to the right of the centerline of strip 31, thereby snapping the upper end of the strip to screw 41 and separating contacts 32, 33 to open the motor circuit.

The temperature at which bimetal 17 is flexed to cause opening of contacts 32, 33 can be adjusted to some extent by shifting the position of contact 33 either to the right or left as viewed in Fig. 2. This adjustment is accomplished by a screw 42, rotatably supported in an opening through one side 43 of the trough-shaped portion of conductor 15 and threaded in an opening in arm 35 which has a normal bias toward the right or away from lug 43. Lug 43 is rigid relative to arm 35 so that the latter flexes either to the right or left when screw 42 is rotated and thereby shifts the point at which tongue 39 crosses the centerline of strip 31 by shifting the position of contact 33. In other words, bimetal 17 will cause opening of the contacts 32, 33 at greater or lesser temperatures thereof, depending upon the position of contact 33, as described.

Terminal member 18 has a binding post 45 formed thereon to which the second power line may be connected, and it is apparent that the total current of motor 10 will pass through terminal member 18, bimetal 17, contacts 32, 33, strip 31, toggle link 30 and bimetal 17. Bimetal 17 is arranged to be heated by excessive motor current, as described hereinafter.

Figure 6:
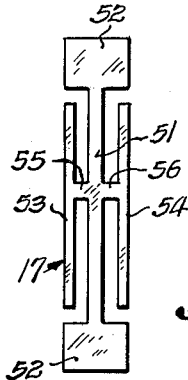
Fig. 6 is a plan view of an improved thremostatic element of the protector.

Referring to Fig. 6, bimetal 17 is formed having a relatively long, narrow section 51, the cross-sectional area of which is such as to carry normal motor running currents without increase in temperature to a point at which it will cause separation of contacts 32 and 33, as described; however, should the flow of current through section 51 be such as would endanger tthe windings of the motor, the section will heat sufficiently to cause the section to flex and effect opening of contacts 32, 33 and break the motor circuit, as described. The ends of section 51 have enlarged, rectangular sections 52 to facilitate attaching opposite ends of the strip to arm 26 and toggle link 30, respectively. Section 51 has formed integral therewith two parallel sections 53, 54 which are connected with section 51 by linking or bridge sections 55, 56 respectively, which restrict the rate of heat conduction between sections 51, and 53, 54. It will be observed that the cross-sectional areas of bridge sections 55, 56 are considerably less than the major cross-sectional area of section 51, i.e., the longitudinal cross-sectional area. Sections 53, 54 do not carry electrical current and they serve either as heat reservoirs or heat radiating surfaces, as explained more fully hereinafter.

As mentioned previously, the electrical resistance of bimetal element 17 is affected by the cross-sectional area thereof and may be determined by well known practices. The resistance is such that in the event of a locked rotor, the sudden surge of high current causes heat to be rapidly generated in section 51 greatly in excess of the rate of heat dissipation therefrom and the element 17 will therefore quickly flex and actuate toggle link 30 to open the motor circuit at contacts 32, 33. Heat flows to the fins 53, 54 from the active or central portion 51 of element 17 and after the motor circuit is opened, this heat flows back from the fins to section 51 to reduce the rate of temperature drop of section 51 and thereby prolong the rate of cooling of the section to a temperature at which it recloses the switch, as compared to a conventional bimetal element.

During running of motor 10, should the current flow through the motor circuit mount gradually, heat generated in section 51 is dissipated by conduction to support arm 26 and link 30 as well as by radiation from fins 53, 54. The fins in this instance tend to nullify the effect of the relatively high resistance in the motor circuit which affords the quick locked rotor response of the bimetal. If the current drawn by the running motor becomes so great that the rate of heat dissipation from section 51 is less than the rate heat is generated in the section, the bimetal flexes and opens the motor circuit.

While bimetal strip 17 is preferably heated by carrying the motor current therethrough, it could be heated by a separate resistance element connected in the motor circuit and positioned adjacent thereto, as is well known in the art pertaining to thermally actuated protective devices for electric motors.

It is to be understood that the form of fins can be altered from that shown in the disclosure and would readily occur to those skilled in the arts; however, it is to be understood that such modifications or alterations may be made, all falling within the scope of the claim which follows.

We claim:

In a thermally actuated switch mechanism for controlling an electric motor, an electric switch, an elongated bimetallic member having a central section adapted to flex upon a predetermined change in temperature to actuate said switch, a pair of elongated outer sections integral with said bimetal and extending along opposite sides thereof in spaced relation thereto, said elongated sections each being engaged solely by bridging sections at the central parts of said central section and said outer sections, said bridging sections having cross sectional areas substantially less than the major cross sectional area of said central section to substantially limit the flow of heat between said central section and said outer sections, and means to heat said central section according to the flow of current through said switch.

References Cited in the file of this patent

UNITED STATES PATENTS

| | | |
|---|---|---|
| 1,820,702 | Hodgkins | Aug. 25, 1931 |
| 2,095,846 | Westendorp | Oct. 12, 1937 |
| 2,614,189 | Mosley | Oct. 14, 1952 |
| 2,875,296 | Enderli | Feb. 24, 1959 |

FOREIGN PATENTS

| | | |
|---|---|---|
| 427,506 | Great Britain | Apr. 25, 1935 |
| 427,512 | Great Britain | Apr. 25, 1935 |